US007364506B2

(12) United States Patent
Jaffe et al.

(10) Patent No.: US 7,364,506 B2
(45) Date of Patent: Apr. 29, 2008

(54) GAMING MACHINE WITH A GRAPHICAL INDICATOR

(75) Inventors: Joel R. Jaffe, Evanston, IL (US); Allon G. Englman, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 621 days.

(21) Appl. No.: 10/368,863

(22) Filed: Feb. 19, 2003

(65) Prior Publication Data

US 2004/0162132 A1 Aug. 19, 2004

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/20; 463/1; 463/9; 463/10; 463/16; 463/17; 463/18; 463/19; 463/30; 273/138.1; 273/139

(58) Field of Classification Search ............ 463/16–23, 463/1, 30, 25; 273/138.1, 139
See application file for complete search history.

(56) References Cited

U.S. PATENT DOCUMENTS

| | | | | |
|---|---|---|---|---|
| 5,332,219 | A * | 7/1994 | Marnell et al. | 463/13 |
| 5,401,023 | A | 3/1995 | Wood | 273/85 CP |
| 5,931,467 | A * | 8/1999 | Kamille | 273/139 |
| 5,976,015 | A | 11/1999 | Seelig et al. | 463/6 |
| 6,089,976 | A * | 7/2000 | Schneider et al. | 463/16 |
| 6,190,255 | B1 | 2/2001 | Thomas et al. | 463/20 |
| 6,203,429 | B1 | 3/2001 | Demar et al. | 463/20 |
| 6,203,430 | B1 | 3/2001 | Walker et al. | 463/20 |
| 6,390,473 | B1 | 5/2002 | Vancura et al. | 273/292 |
| 6,394,899 | B1 | 5/2002 | Walker | 463/9 |

(Continued)

FOREIGN PATENT DOCUMENTS

GB 2 087 618 A 5/1982

(Continued)

OTHER PUBLICATIONS

Article, "Family Feud!", *Strickly Slots*, p. 56, Aug. 2000.

(Continued)

*Primary Examiner*—Xuan M. Thai
*Assistant Examiner*—Meagan Thomasson
(74) *Attorney, Agent, or Firm*—Nixon Peabody LLP

(57) ABSTRACT

A wagering game in which a graphical indicator may be used to identify a positive outcome, or a negative outcome, or where multiple graphical indicators may be used to identify and distinguish both positive and negative outcomes in a selection game, which has a plurality of player selectable markers. The player may select markers to reveal an outcome. The outcome may be a credit award, a multiplier, or any other award that provides a player with a benefit, either monetary, or in the context of game play (e.g., a free selection). The graphical indicator is provided the player either on a random basis, as an incentive award for a player tracking system, or simply provided on the basis of game play criteria. The graphical indicator may also be used to denote a subset of markers, at least one of which has the indicated outcome.

35 Claims, 10 Drawing Sheets

U.S. PATENT DOCUMENTS

| | | | | |
|---|---|---|---|---|
| 6,398,218 | B1 | 6/2002 | Vancura | 273/138.1 |
| 6,439,995 | B1 * | 8/2002 | Hughs-Baird et al. | 463/20 |
| 6,514,141 | B1 | 2/2003 | Kaminkow et al. | 463/25 |
| 6,602,137 | B2 * | 8/2003 | Kaminkow et al. | 463/16 |
| 6,634,943 | B1 * | 10/2003 | Baerlocher | 463/25 |
| 6,666,765 | B2 * | 12/2003 | Vancura | 463/9 |
| 6,722,983 | B2 * | 4/2004 | Kaminkow et al. | 463/26 |
| 6,783,457 | B2 * | 8/2004 | Hughs-Baird et al. | 463/20 |
| 6,786,824 | B2 * | 9/2004 | Cannon | 463/42 |
| 6,817,944 | B2 * | 11/2004 | Kaminkow et al. | 463/16 |
| 6,878,061 | B2 * | 4/2005 | Baerlocher et al. | 463/16 |
| 6,913,533 | B2 * | 7/2005 | Cuddy et al. | 463/16 |
| 6,913,535 | B2 * | 7/2005 | Kaminkow et al. | 463/26 |
| 6,942,567 | B2 * | 9/2005 | Baerlocher et al. | 463/16 |
| 2003/0125106 | A1 * | 7/2003 | Baerlocher et al. | 463/20 |
| 2004/0023707 | A1 * | 2/2004 | Maya et al. | 463/16 |

FOREIGN PATENT DOCUMENTS

| | | | |
|---|---|---|---|
| GB | 2 185 612 | A | 7/1987 |
| GB | 2 197 974 | A | 6/1988 |
| GB | 2 217 500 | A | 10/1989 |
| GB | 2 262 642 | A | 6/1993 |
| GB | 2 369 916 | A | 6/2002 |

OTHER PUBLICATIONS

Article, "Bingo Spins", *Strickly Slots*, p. 64, Mar. 2001.
Article, "Believe It Or Not", *Strickly Slots*, p. 64, Jun. 2001.
Article, "Oh, Behave", *Strickly Slots*, p. 56, Jan. 2001.
Article, "Munch Money", *Strickly Slots*, p. 50, Jul. 2002.
Article, "Shifting Slot Replacement Cycles", *Global Gaming Business*, p. 20, Dec. 2002.

* cited by examiner

GAMING MACHINE WITH A GRAPHICAL INDICATOR

FIELD OF THE INVENTION

The present invention relates generally to gaming machines and, more particularly, to a gaming machine which provides the user with graphical assistance to aid in the selection of a winning game outcome.

BACKGROUND OF THE INVENTION

Gaming machines, such as slot machines, video poker machines and the like, have been cornerstones of the gaming industry for many years. Generally, the popularity of these machines is dependent on the likelihood (or perceived likelihood) of winning money at the machine and the intrinsic entertainment value of the machine compared with other available gaming options. When available gaming options include many competing machines and the expectation of winning each machine are roughly the same (or believed to be the same), players are most likely to be attracted to the most entertaining and exciting of the machines. Shrewd operators consequently strive to employ the most entertaining and exciting machines available because such machines attract frequent play and therefore increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar or completely different from the basic game, which is entered upon the occurrence of a selected event or outcome of the basic game. The bonus game concept offers tremendous advantages in player appeal and excitement relative to other known games. Since such games are attractive to both players and operators, there is a continuing need to develop new features and themes for bonus games to satisfy the demands of players and operators. Preferably, such new bonus game features and themes will maintain, or even further enhance, the level of player excitement offered by bonus games previously known in the art. The present invention is directed to satisfying these needs.

SUMMARY OF THE INVENTION

A slot machine conducts a wagering game in which pluralities of arrays of symbols are successively displayed. In each spin, the reels are rotated and stopped to place the symbols on the reels in visual association with a display area. Payouts for the successive arrays are awarded according to a pay table. Besides receiving a pay out for the basic game, the player may also enter a bonus game and be eligible for further awards associated with the bonus game. One or more of the symbols of each array may be designated to allow the player to commence bonus game play.

Many of these bonus games entail a selection feature that allows players to make random selections from a plurality of markers with hidden outcomes. Only after the player makes his selection is the outcome of the marker revealed. The bonus game may be ended in any number of ways, such as, after the player has made a fixed number of selections, after a maximum award has been credited to the player, after a specified time limit, or after a player has selected a exit marker which ends the bonus game. Any number of other methodologies may also be employed to exit the player from the bonus game.

To provide greater richness and excitement to this straightforward bonus game, the present invention can graphically direct a player to a marker with a positive outcome, or warn a player of a marker with a negative outcome. The graphic indicator can occur randomly, or in response to specific game play criteria. The graphical nature of this advisory provides an opportunity to enrich the game; both from the perspective of a more evolved game strategy, as well as increasing anticipation and excitement through the sudden, and random appearance of the graphic indicator.

BRIEF DESCRIPTION OF THE DRAWINGS

The foregoing and other advantages of the invention will become apparent upon reading the following detailed description and referring to the drawings in which.

Figure 1:
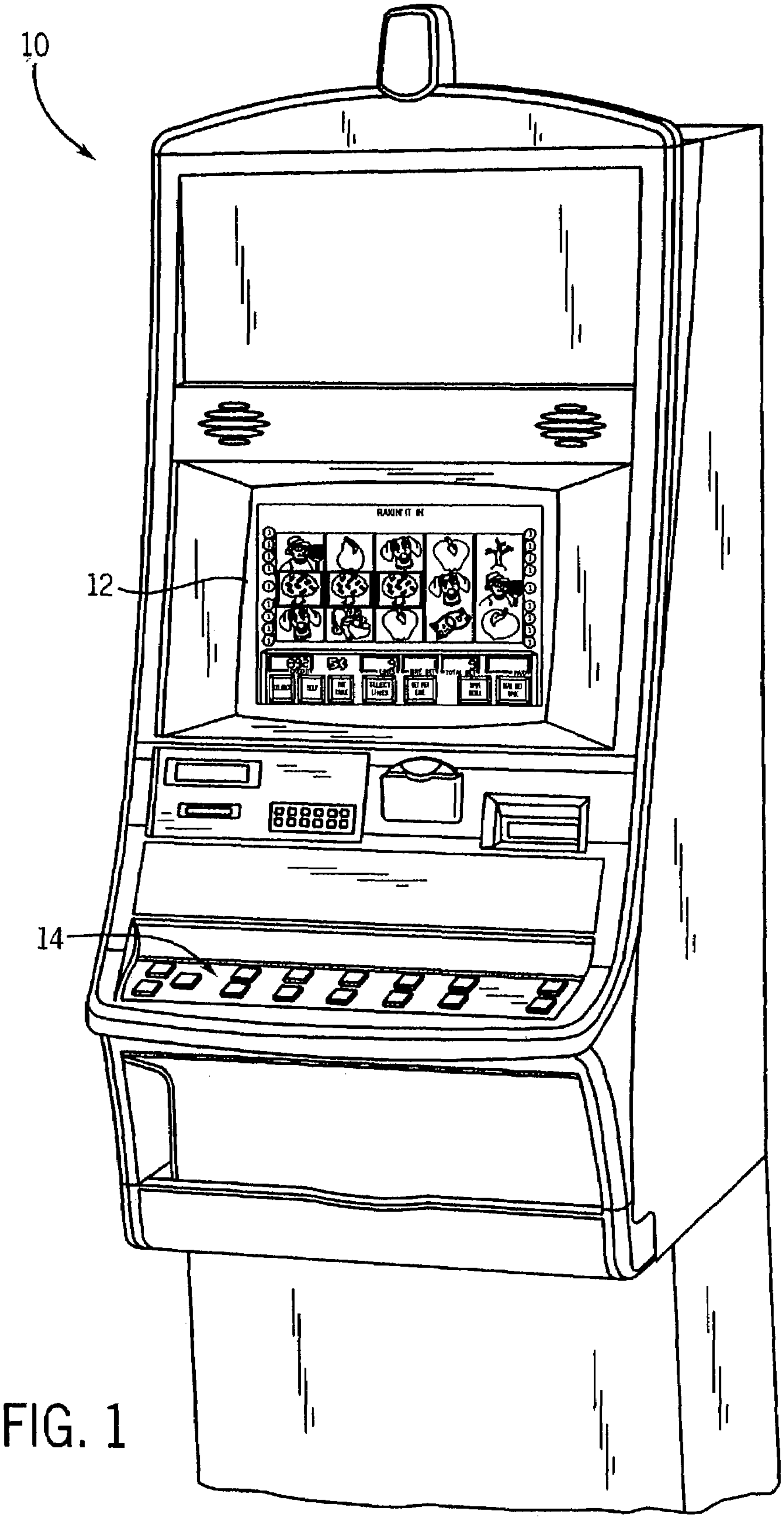
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a wagering game. The wagering game includes a basic slot game with five simulated spinning reels. The basic slot game may produce certain outcomes for triggering other special features and bonus games. The gaming machine also has a bonus game with a fall leaf-raking theme.

The gaming machine 10 includes a visual display 12 preferably in the form of a dot matrix, CRT, LED, LCD, electro-luminescent, or other type of video display known in the art. The display 12 preferably includes a touch screen overlaying the monitor. The visual display 12 may be used for both the basic as well as the bonus game, alternately displaying the basic and bonus game, or displaying both games simultaneously. Alternately the gaming machine may have separate visual displays, one used for the basic game and the other for the bonus game.

In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
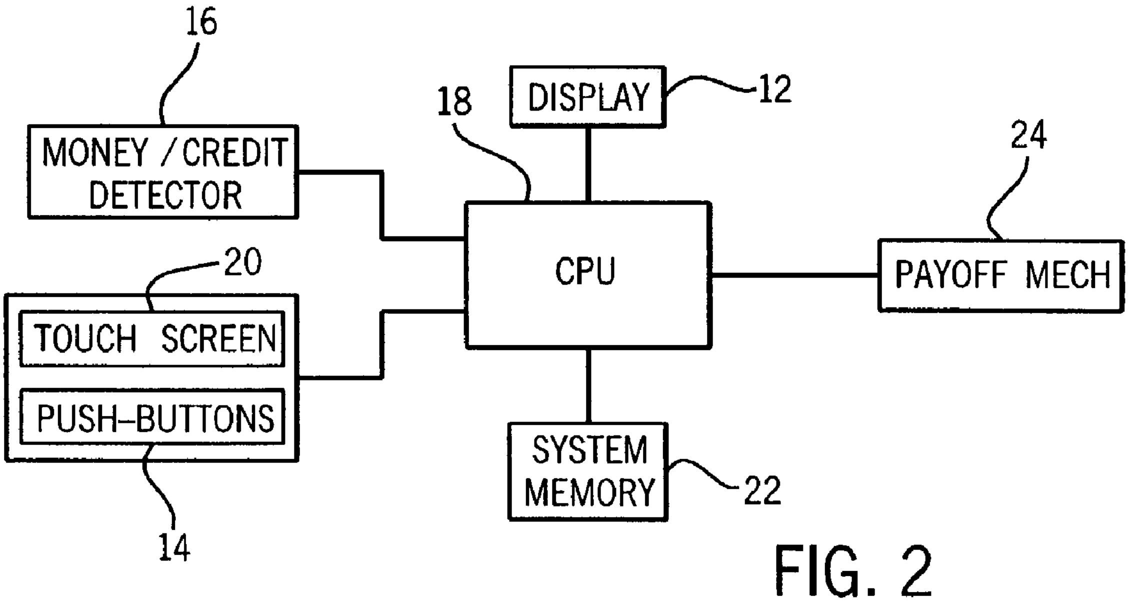
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. Coins, bills, tickets, coupons, cards, etc may provide the money. Then, the CPU 18 operates to execute a game program that causes the display 12 to display five simulated symbol-bearing reels. The player may select a number of pay lines to play, an amount to wager, and start game play via the touch screen 20 or the push-buttons 14, causing the CPU 18 to set the reels in motion, randomly select a game outcome, and then stop the reels to display symbols corresponding to the pre-selected game outcome. In one embodiment, a pre-determined basic game outcome triggers the bonus game with a start-bonus outcome. The player is allowed to play the bonus game, collecting as many credits as possible, before being exited from the bonus back into the basic game.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or the dynamic wild symbol feature. The payoff may be provided in the form of coins, bills, tickets, coupons, cards, etc. One or more pay tables stored in the system memory 22 determine the payoff amounts.

Figure 3:
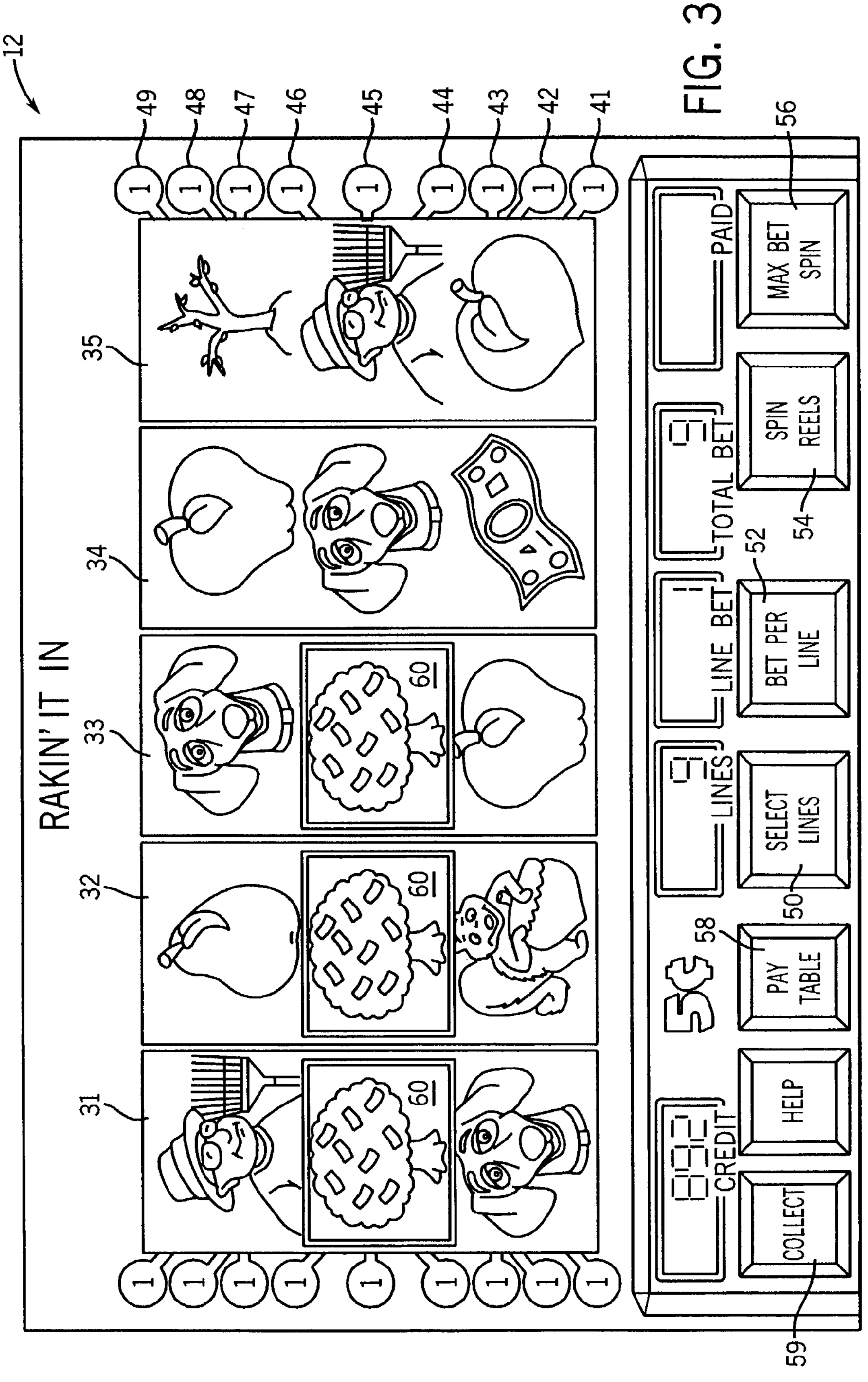
FIG. 3 is a display image associated with a basic slot game showing a symbol combination for triggering a bonus game feature.

Referring to FIG. 3, the basic game is implemented on the display 12 on five video simulated spinning reels 31-35 with nine pay lines 41-49. Each of the pay lines 41-49 extends through one symbol on each of the five reels 31-35. Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 31-35 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU uses a random number generator to select a game outcome (e.g., "basic" game outcome) corresponding to a particular set of reel "stop positions." The CPU then causes each of the video reels 31-35 to stop at the appropriate stop position.

Winning basic game outcomes (e.g., symbol combinations resulting in payment of coins or credits) are identifiable to the player by a pay table. In one embodiment, the pay table is affixed to the gaming machine 10 and/or displayed by the video display 12 in response to a command by the player (e.g., by pressing the "Pay Table" button 58). A winning basic game outcome occurs when the symbols appearing on the reels 31-35 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 59. In one implementation, the winning combinations start from the first reel 31 (left to right) and span adjacent reels. In an alternative implementation, the winning combinations start from either the first reel 31 (left to right) or the fifth reel 35 (right to left) and span adjacent reels.

Included among the pluralities of basic game outcomes is a start-bonus outcome for triggering play of a bonus game. A start-bonus outcome may be defined in any number of ways. For example, a start-bonus outcome occurs when a special start-bonus symbol or a special combination of symbols appears on one or more of the reels 31-35. The start-bonus outcome may require the combination of symbols to appear along an active pay line, or may alternatively require that the combination of symbols appear anywhere on the display regardless of whether the symbols are along an active pay line. Appearance of the appropriate start-bonus outcome causes the CPU to shift operation from the basic game to the bonus game.

In the embodiment illustrated in FIG. 3, the appearance of three Money Tree symbols 60 anywhere on the display is the start-bonus outcome that triggers a bonus game. The start-bonus outcome however, may be any pre-determined outcome.

Figure 4:
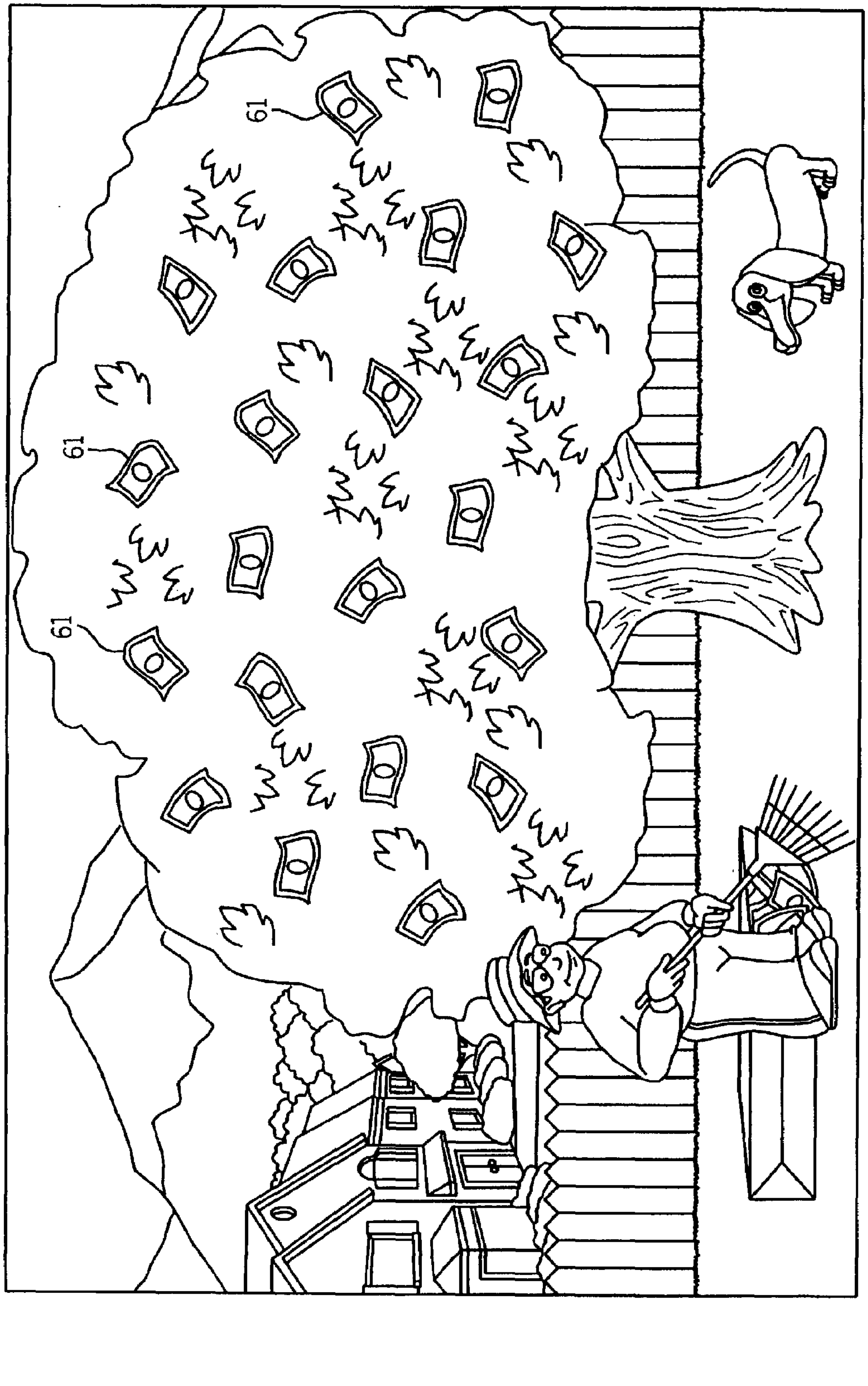
FIG. 4 is a display image associated with a bonus game showing the start of the bonus game and possible player selections.

In response to the start bonus outcome in the basic game, a bonus game commences as depicted in FIG. 4. FIG. 4 depicts a themed bonus game where Farmer Mike and his faithful dachshund, Loki, entertain players with their animated antics while players select bills from the Money Tree. These bills are markers 61 that, when selected, reveal a hidden game outcome, such as, a bonus award, among other possibilities. As can be seen from FIG. 4, there are a plurality of these markers from which a player may select.

Figure 5:
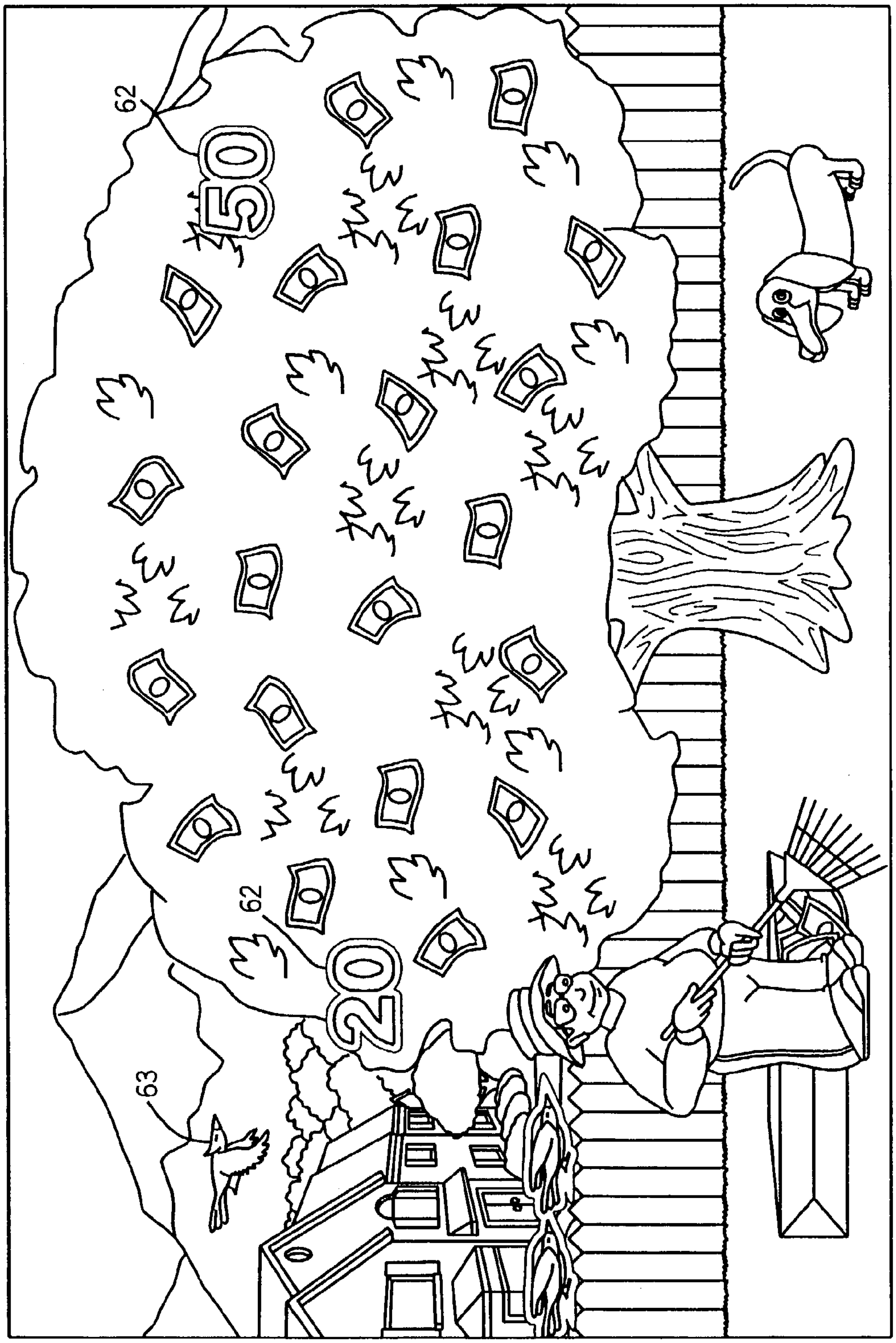
FIG. 5 is a display image of the bonus game with a positive graphical indicator counter and two player selections.

Referring to FIG. 5, a player has selected two markers, revealing two bonus awards 62. In this particular embodiment, the player may continue to select markers until a negative outcome, or stopper, is revealed and the player is returned to the basic game. FIG. 5 also reveals a positive graphical indicator counter 63. In FIG. 5 the positive graphical indicator counter is a bird 63. The positive graphical indicator counters may be earned in the base game and saved for later use in the bonus game. Furthermore the counter may be used at the player's direction, or in other embodiments, randomly selected for use by the gaming machine.

Figure 6:
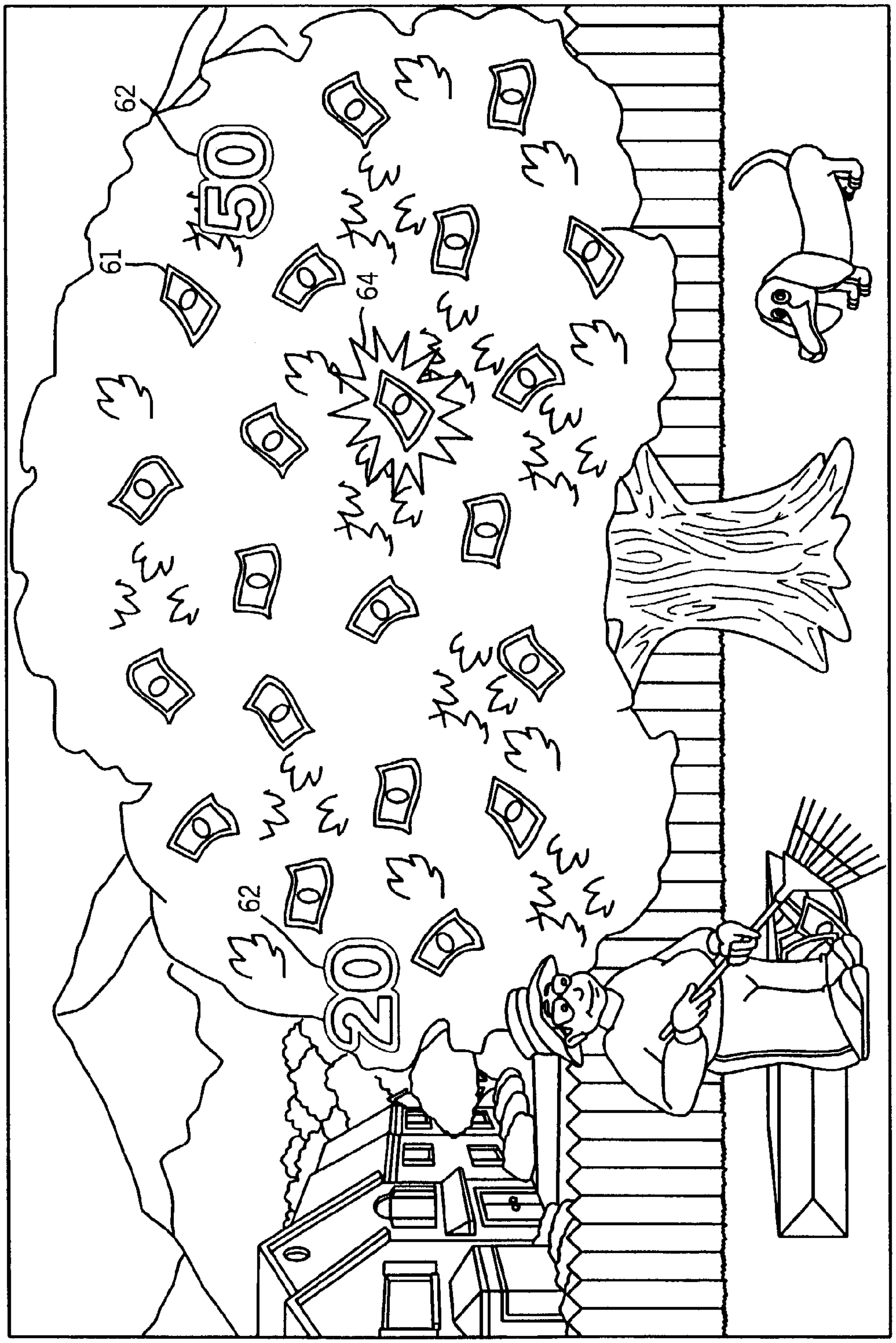
FIG. 6 is a display image showing a positive graphical indicator after the positive graphical indicator counter has been used to make a marker selection.

In FIG. 6 the positive graphical indicator 63 (shown as the animated character Lucky Bluebird) touches one of the markers (bills) and converts it into a positive graphical indicator 64 causing the marker (bill) to become highlighted, distinguishing this marker from the remaining selectable markers. This graphical distinction is the positive graphical indicator that signals the player that a positive outcome is available from the selection of this particular marker.

Figure 7:
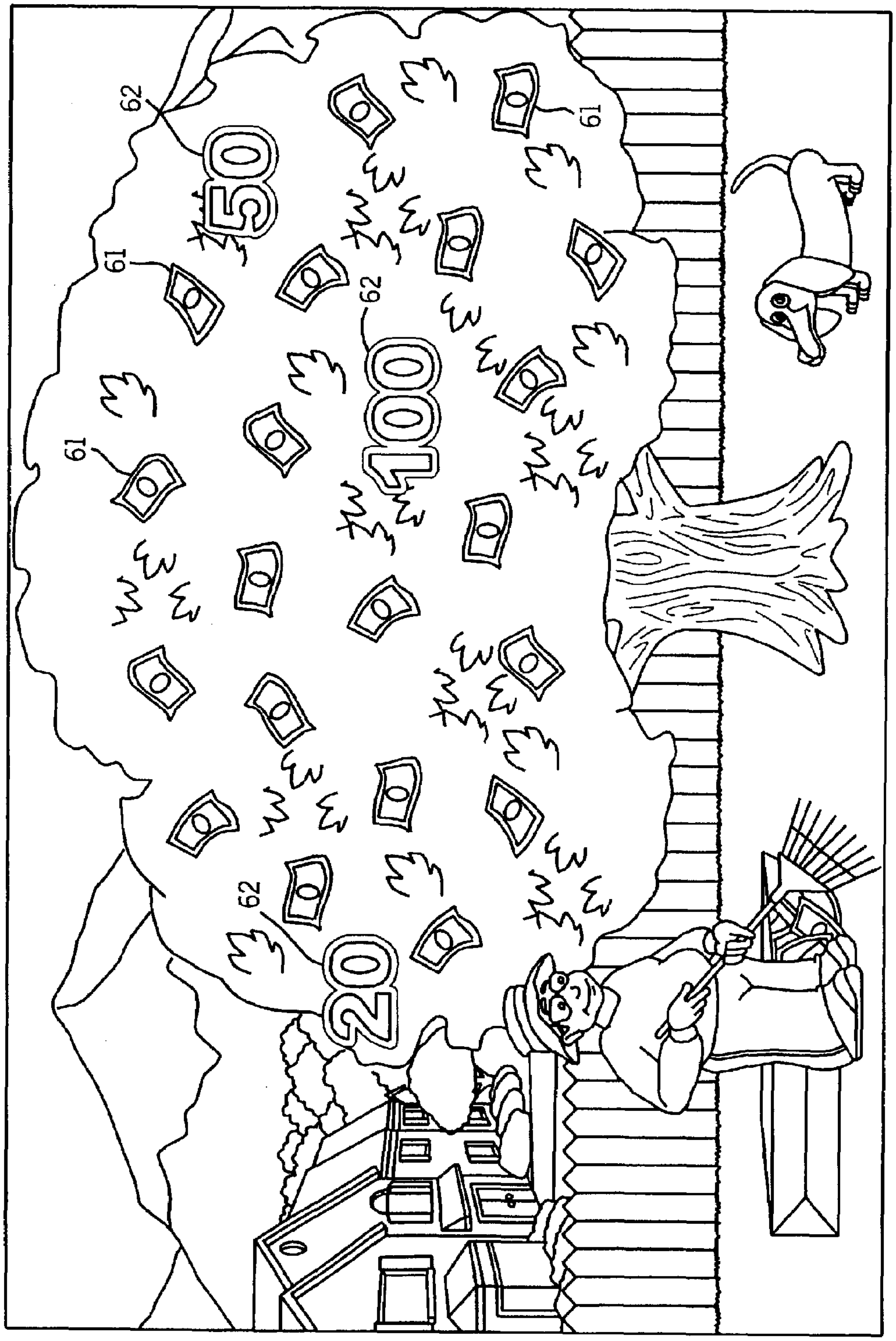
FIG. 7 is a display image of the outcome of the player's selection of the marker designated with the positive graphical indicator.

As shown in FIG. 7, the player has selected the positive graphical indicator 64 depicted in FIG. 6 and a bonus award 62 of 100 credits has been awarded. The positive outcome need not be the best highest award available on the tree. For example, the Money Tree may still have a 200 credit award available. Likewise, the positive outcome may not necessarily be a credit amount, but may only have a positive affect on the play of the bonus game. For example, the positive outcome might allow the player to multiply the credits earned during the bonus game, or make additional selections at the Money Tree.

Figure 8:
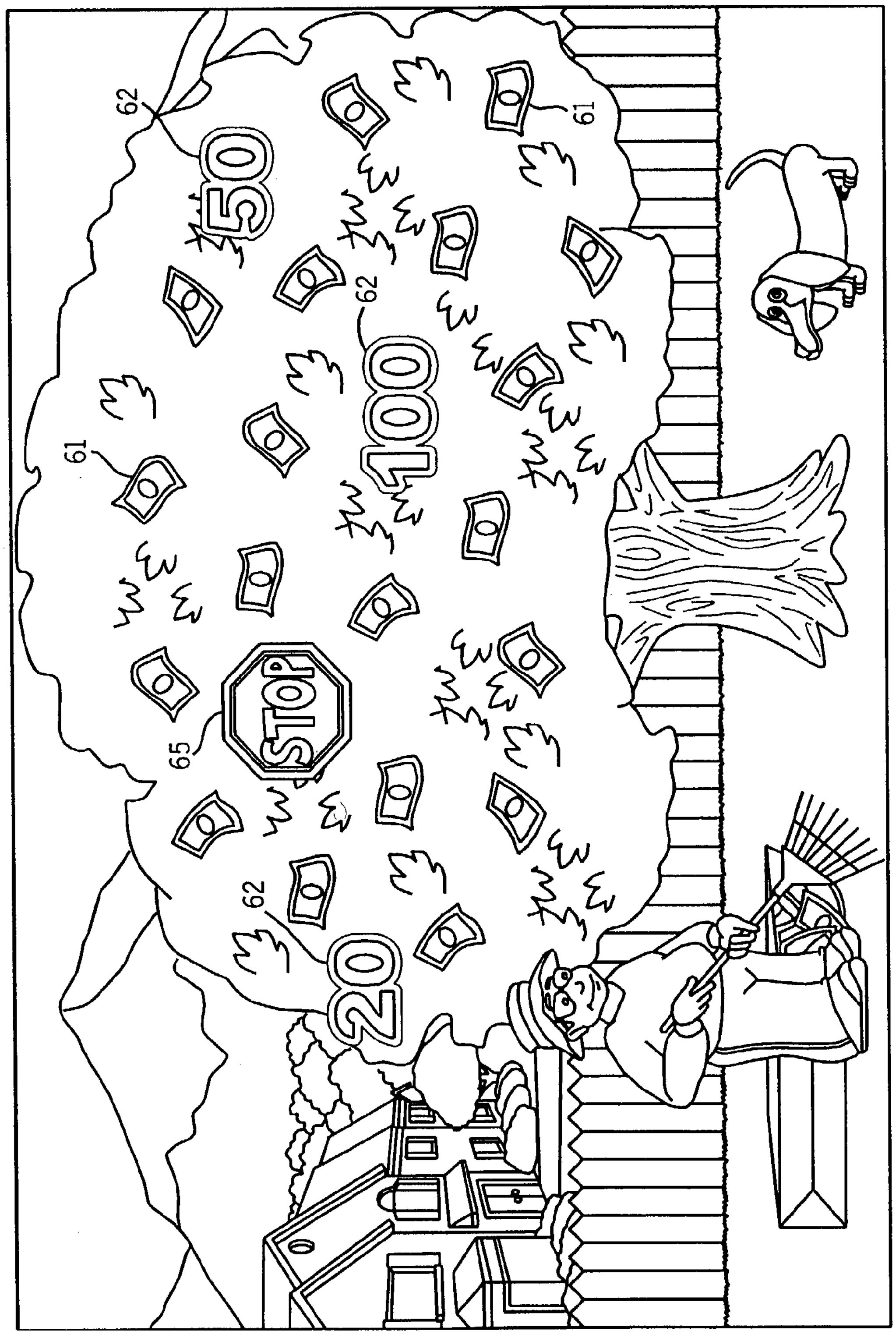
FIG. 8 is a display image of a player's selection of a marker that has a hidden exit marker that exits the player from the bonus game.

The bonus game ends when the player selects a marker 61 that reveals an exit marker 65 as shown in FIG. 8. This ends the bonus game and puts the player back into the basic game play mode. Any credits earned during the bonus game play may be awarded to the player.

Although the graphical indicators in the embodiments described above all indicate positive events, the graphical indicators may also be used to denote markers with negative outcomes. For example, there may be multiple negative outcomes associated with a plurality of markers. Those markers with negative outcomes may be selectively denoted with negative graphical indicators. The gaming machine may be set up to reject any player attempt to select a marker with a negative graphical indicator to ensure that a player does not inadvertently select a losing marker. If desired, a game may have negative graphical indicators, positive graphical indicators, or both positive and negative graphical indicators. Further, negative graphical indicator counters may be used to accumulate negative graphical indicators for use in the bonus game.

Figure 9:
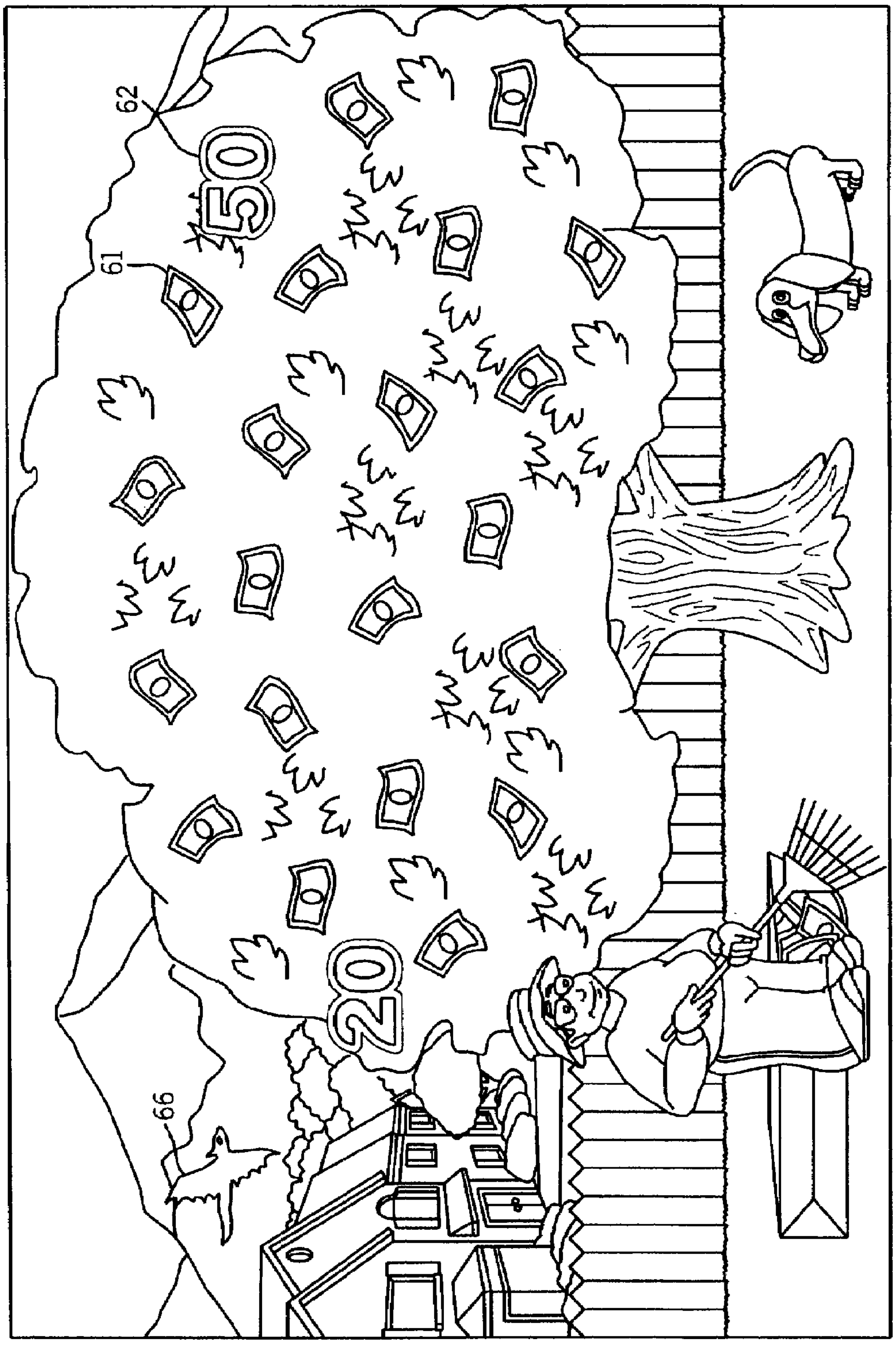
FIG. 9 is a display image with a negative graphical indicator counter and two player selections.
Figure 10:
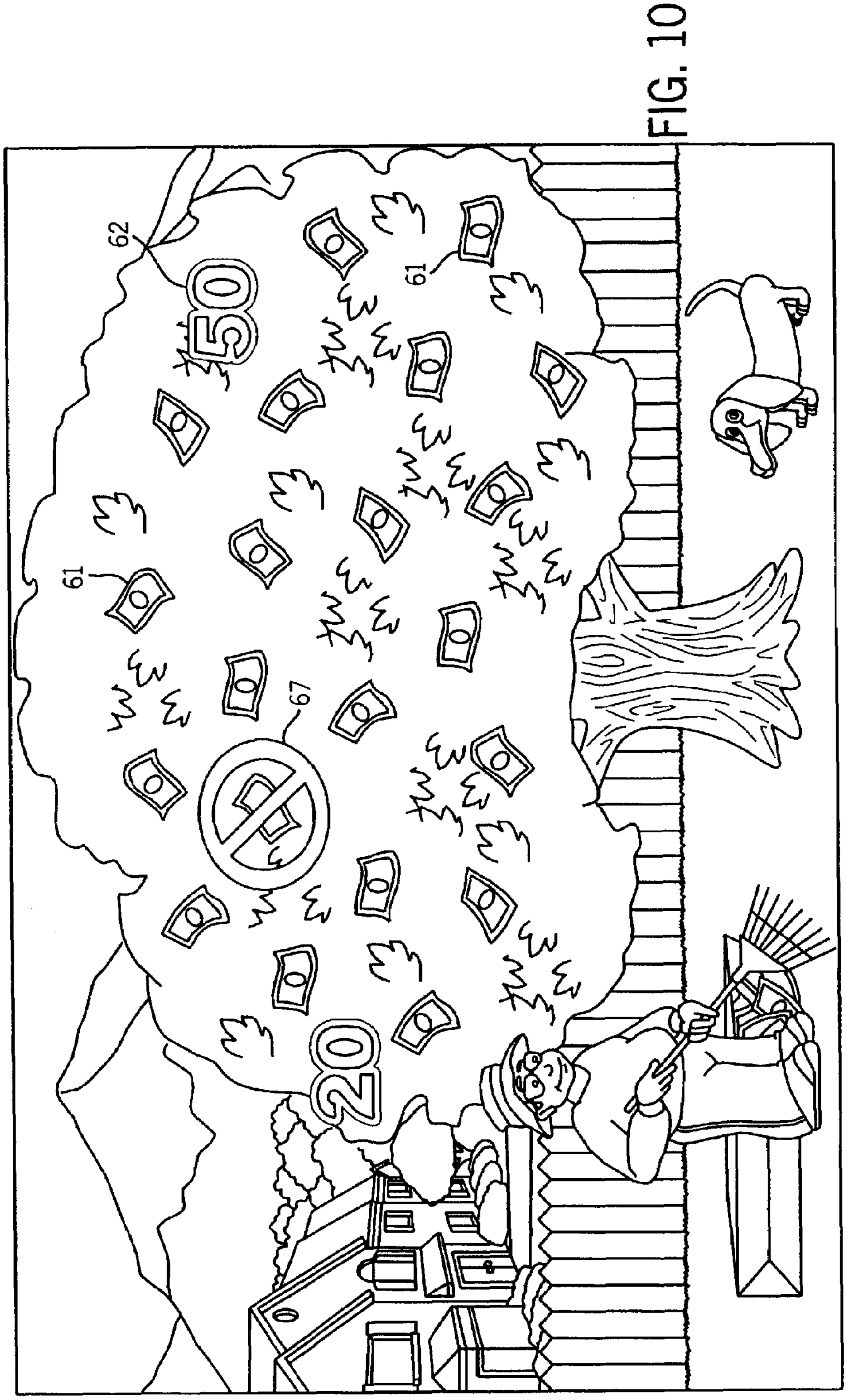
FIG. 10 is a display image showing a negative graphical indicator after the negative graphical indicator counter has been used to make a marker selection.

An example of a negative graphical indicator counter 66 (shown as the animated character Bad Bat) is provided in FIG. 9. FIG. 10 displays a negative graphical indicator 67 as a universal "Do Not" sign to cross out a marker with a negative outcome. Potentially there can be sufficient negative graphical indicator counters earned during basic game play to allow all exit markers to be identified in the bonus game, allowing a player to win all the bonus awards available. However, to maintain some element of surprise, a player may only be allowed to win fewer negative graphical indicator counters than there are exit markers.

The above wagering game is explained above in the context of its use in a combination of both a basic game and a bonus game. However, in an alternate embodiment, the wagering game could be played without the basic game. Rather than using play on a basic game, such as a slot machine, to qualify for game play in the bonus game mode, the player could play the bonus game with the graphical indicator feature by simply placing an initial wager. In this embodiment the wagering game becomes a simple selection game.

Although the graphical indicator discussed in the example above was triggered randomly, other means are available to determine when a graphical indicator is provided to a player. For example, specific game play criteria may cause the gaming machine to initiate a graphical indicator. A graphical indicator may assist a player who is not doing well in the bonus game to help boost the player's score. Similarly, a player may be rewarded with a graphical indicator in the bonus game who has not done well in the basic game. This is a particularly effective means for providing positive reinforcement to players that have spent considerable time at the gaming machine, shown loyalty to the game, and have experienced greater than average losses.

Rewarding players with a graphical indicator can be more broadly generalized by rewarding players for their loyalty to the casino. Players, who have reached specified levels of wagering activity, may be rewarded with graphical indicators in the bonus game. These rewards are most easily provided to players with player tracking cards, which tie the gaming machine to a central controller. The central controller determines when rewards are to be provided a player. The bonus game may be modified to allow the central controller to automatically provide a player with a "free" graphical indicator during the play of the bonus game.

Alternately, a player may be rewarded with graphical indicators during basic game play. For example, certain predetermined outcomes may entitle a player to a graphical indicator. Graphical indicator counters may be used to track the number of graphical indicators earned by a player for later use by the player in the bonus game. Although only one graphical indicator counter 63, 66 is shown in FIG. 5 and FIG. 9, respectively, multiple graphical indicator counters could be used to keep track of the number of graphical indicators a player has and of what type (i.e., either negative or positive). These counters are available to the player for use in the bonus game and may be used as soon as the start-bonus outcome is triggered. These counters 63, 66 disappear after they are used to designate a marker 61 with a graphical indicator 64, 67. Additionally, it may be possible to decline play in the bonus game, and try to win further graphic indicators before being entered into the bonus game with the intent of maximizing winnings from the bonus game.

If desired, the player may be allowed to cash out the graphical indicator counters if the player does not make it into the bonus game, or otherwise decides to leave the game. The cash out value for the counters will generally be less that what might have been earned in the bonus game. This provides a means to entice players to continue playing the game. The counters may be a part of the pay table if the player elects to cash out of the game. Otherwise, if the player moves into the bonus game, the positive graphical counters are an assured means to achieve at least the cash out value of the markers by selecting the positive graphical indicators. Negative graphical indicators, because they may not provide an assured means for a player to obtain additional value, either may not be cashed out, or cashed out at some reduced value.

In general graphical indicators may be used in any number of ways to increase interest in the game, provide incentive to continue playing the game, and as a mechanism to reward players for any number of reasons, e.g., for extensive play, as a consolation award for a losing streak, etc. For example, graphical indicators may be utilized in any bonus game where a player makes a selection from a plurality of possible selections. The player selections do not even require that the markers be hidden, as revealed markers may route a player to other selections that ultimately determine the outcome of the selection.

Graphical indicators also provide a means to augment the pay table to ensure some minimum level of player return in the event the player has extremely bad luck at the gaming machine. It is also a way to reward loyal players. Finally, it is also a way to provide very high payout awards for low frequency events through the accumulation of multiple graphical indicator counters, which can be used in the bonus game to maximize the collection of credits.

While the present invention has been described with reference to one or more particular embodiments, those skilled in the art will recognize that many changes may be made thereto without departing from the spirit and scope of the present invention. Each of these embodiments and obvious variations described above is contemplated as falling within the spirit and scope of the claimed invention, which is set forth in the following claims.

What is claimed is:

1. A method of conducting a wagering game on a gaming machine, comprising:
- receiving a wager from a player to initiate play of the wagering game;
- displaying on a video display a plurality of player selectable markers, each marker having an associated outcome that is awarded to the player upon selection;
- assigning a graphic indicator to one of the markers with a positive outcome, the graphic indicator visually distinguishing the assigned marker from the non-assigned markers to indicate to a player that, upon selection of the distinguished marker, the player will receive an award;
- after the assigning and visually distinguishing, receiving the player's selection of the distinguished marker; and
- awarding the player the award as a direct result of selecting the distinguished marker, and wherein the player cannot receive an end-game outcome as a direct result of selecting the distinguished marker.

2. The method of claim 1, wherein assigning a graphic indicator to one of the markers is performed randomly during the play of the wagering game.

3. The method of claim 1, wherein assigning a graphic indicator to one of the markers is responsive to game play criteria of the wagering game.

4. The method of claim 1, wherein assigning a graphic indicator to one of the markers is performed at a request of said player.

5. The method of claim 1, further including conducting a basic game in response to the wager and conducting a bonus game in response to a start-bonus outcome in the basic game, the bonus game including the displaying step, the assigning step, the receiving step, and the awarding step.

6. The method of claim 5, further including achieving a predetermined outcome in the base game to participate in the bonus game.

7. The method of claim 5, wherein assigning a graphic indicator to one of the markers is performed randomly during the play of the basic game.

8. The method of claim 5, wherein assigning a graphic indicator to one of the markers is responsive to game play criteria in the bonus game.

9. The method of claim 5, wherein assigning a graphic indicator to one of the markers is responsive to game play criteria of the basic game.

10. The method of claim 5, further including awarding the graphic indicator for predetermined basic game outcomes.

11. The method of claim 10, further including deferring the bonus game when the start-bonus outcome in the basic game occurs, continuing play on the basic game, playing the bonus game when a subsequent start-bonus outcome in the basic game occurs.

12. A gaming machine comprising:
- a wagering apparatus for receiving a wager from a player to initiate a play of a wagering game;
- a display for displaying a plurality of player selectable markers, each marker having an associated outcome;
- means for graphically indicating one of the markers having a positive outcome, the graphically indicating including visually distinguishing the one of the markers having an award prior to player selection of the marker to indicate to the player that, upon selection, the player will receive the award; and
- an award apparatus for awarding the player with the award as a direct result of selecting the distinguished marker, and wherein the distinguished marker cannot be associated with an end-game outcome, the player being allowed to make at least one additional selection from the plurality of player selectable markers upon selection of the distinguished marker.

13. The machine of claim 12, wherein the means for graphically indicating one of the markers is in response to predetermined game play criteria.

14. The machine of claim 12, wherein the means for graphically indicating one of the markers is performed randomly.

15. The machine of claim 12, wherein the means for graphically indicating one of the markers is performed at a request of the player.

16. A gaming machine comprising:
- a wagering apparatus for receiving a wager from a player to initiate a play of a wagering game;
- a basic game having a start-bonus outcome;
- a bonus game responsive to said start-bonus outcome in said basic game;
- a display for displaying a plurality of player selectable markers for said bonus game, each marker having an associated outcome that is awarded to the player upon selection;
- means for graphically indicating at least one of the markers having either a positive outcome or a negative outcome, said graphically indicating including visually distinguishing the at least one of the markers having either an associated award or a game-terminating outcome prior to player selection to indicate to a player that, upon selection, the player will receive the associated award or game-terminating outcome, the associated award being an unspecified award which is not revealed to the player prior to selection of the distinguished marker; and
- an award apparatus for awarding the player with the associated award or game-terminating outcome as a direct result of selecting the distinguished marker.

17. The machine of claim 16, wherein the means for graphically indicating the one of the markers is in response to predetermined game play criteria.

18. The machine of claim 16, wherein the means for graphically indicating the one of the markers is performed randomly.

19. The machine of claim 16, wherein the means for graphically indicating the one of the markers is performed at a request of said player.

20. A method of conducting a wagering game on a gaming machine, comprising:
- receiving a wager from a player to initiate play of the wagering game;
- displaying on a video display a plurality of player selectable markers, each marker having an associated outcome that is awarded to the player upon selection;

assigning a graphic indicator to at least one of the markers with a negative outcome, said graphic indicator visually distinguishing the at least one of the markers with a game-terminating outcome to indicate to the player that, upon selection, the player will receive the game-terminating outcome;

after the assigning and visually distinguishing receiving the player's selection of the distinguished marker; and awarding the player the game-terminating outcome as the direct result of selecting the distinguished marker such that no further selections of player selectable markers may be made by the player.

21. The method of claim 20, wherein assigning a graphic indicator to the one of the markers is performed randomly during the play of the wagering game.

22. The method of claim 20, wherein assigning a graphic indicator to the one of the markers is responsive to game play criteria of the wagering game.

23. The method of claim 20, wherein assigning a graphic indicator to the one of the markers is performed at the request of said player.

24. The method of claim 20, further including conducting a basic game in response to the wager and conducting a bonus game in response to a start-bonus outcome in the basic game, the bonus game including the displaying step, the assigning step, the receiving step, and the awarding step.

25. The method of claim 24 further including achieving a predetermined outcome in the base game to participate in the bonus game.

26. The method of claim 24, wherein assigning a graphic indicator to the one of the markers is performed randomly during the play of the basic game.

27. The method of claim 24, wherein assigning a graphic indicator to the one of the markers is responsive to game play criteria in the bonus game.

28. The method of claim 24, wherein assigning a graphic indicator to the one of the markers is responsive to game play criteria of the basic game.

29. The method of claim 24, further including awarding the graphic indicator for predetermined basic game outcomes.

30. The method of claim 24 further including deferring a bonus game when the start-bonus outcome in the basic game occurs, continuing play on the basic game, playing the bonus game when a subsequent start-bonus outcome in the basic game occurs.

31. A gaming machine comprising:

a wagering apparatus for receiving a wager from a player to initiate a play of a wagering game;

a display for displaying a plurality of player selectable markers, each marker having an associated outcome;

a means for graphically indicating that at least one of the markers has a negative outcome, the graphically indicating including visually distinguishing the at least one of the markers that has a game-terminating outcome prior to selection of the marker to indicate to the player that, upon selection, the player will receive the game-terminating outcome; and an award apparatus for awarding the player with the game-terminating outcome as the direct result of selecting the distinguished marker, and wherein upon selection, no additional selections of player selectable markers are allowed for the player.

32. The machine of claim 31, wherein the means for graphically indicating at least one of the markers is in response to predetermined game play criteria.

33. The machine of claim 31, wherein the means for graphically indicating at least one of the markers is performed randomly.

34. The machine of claim 31, wherein the means for graphically indicating at least one of the markers is performed at the request of a player.

35. A gaming machine comprising:

a wagering apparatus for receiving a wager from a player to initiate a play of a wagering game;

a display for displaying a plurality of player selectable markers, each marker having an associated outcome;

a first graphical indicator for visually indicating at least one marker having a positive outcome prior to player selection of the at least one marker having a positive outcome, wherein the marker having a positive outcome is associated with an unspecified award and wherein the player cannot receive an end-game outcome as a direct result of selecting the distinguished marker having a positive outcome;

a second graphical indicator for visually indicating at least one marker having a negative outcome prior to player selection of the at least one marker having a negative outcome, wherein the first and second graphical indicators are responsive to predetermined game play criteria; and an award apparatus for awarding the player with the outcome associated with the selected marker.

* * * * *